US008249226B2

(12) United States Patent
Lingafelt et al.

(10) Patent No.: US 8,249,226 B2
(45) Date of Patent: Aug. 21, 2012

(54) IN-PROGRESS VOICEMAIL TRANSFER BASED ON IDENTITY (75) Inventors: Charles Steven Lingafelt, Durham, NC (US); Brian M. O'Connell, Cary, NC (US); Keith R. Walker, Austin, TX (US); John E. Moore, Brownsburg, IN (US); Martinianus BudiTjahja Hadinata, Brunnen (CH)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 12/055,859

(22) Filed: Mar. 26, 2008

(65) Prior Publication Data
US 2009/0245486 A1 Oct. 1, 2009

(51) Int. Cl.
H04M 1/64 (2006.01)
H04M 3/42 (2006.01)

(52) U.S. Cl. .................... 379/88.22; 379/215.01

(58) Field of Classification Search ............... 379/88.22, 379/215.01
See application file for complete search history.

(56) References Cited

U.S. PATENT DOCUMENTS

| | | | |
|---|---|---|---|
| 5,303,298 A | 4/1994 | Morganstein et al. ........ 379/67 |
| 5,471,519 A * | 11/1995 | Howe et al. .............. 379/88.26 |
| 5,642,428 A | 6/1997 | Nowack | |
| 5,850,435 A * | 12/1998 | Devillier ............... 379/374.02 |
| 5,857,013 A * | 1/1999 | Yue et al. ............... 379/88.2 |
| 5,930,698 A * | 7/1999 | Bertacchi ............... 455/405 |
| 5,937,056 A * | 8/1999 | Coyne et al. ........... 379/221.01 |
| 5,943,402 A * | 8/1999 | Hamel et al. ........... 379/88.26 |
| 5,960,064 A * | 9/1999 | Foladare et al. ......... 379/88.26 |
| 5,974,131 A * | 10/1999 | Malik .................. 379/215.01 |
| 6,026,156 A * | 2/2000 | Epler et al. ............. 379/215.01 |
| 6,031,896 A * | 2/2000 | Gardell et al. ......... 379/88.17 |
| 6,078,648 A * | 6/2000 | Albers et al. ........... 379/35 |
| 6,084,948 A * | 7/2000 | Otake ................... 379/35 |
| 6,233,325 B1 * | 5/2001 | Frech et al. ............. 379/142.06 |
| 6,236,716 B1 * | 5/2001 | Marcus et al. ........... 379/88.15 |
| 6,324,263 B1 * | 11/2001 | Sherwood et al. ........ 379/88.19 |
| 6,335,927 B1 | 1/2002 | Elliott et al. | |
| 6,594,534 B1 | 7/2003 | Crowell | |
| 6,735,288 B1 | 5/2004 | Geen et al. | |
| 6,792,082 B1 | 9/2004 | Levine | |
| 6,912,272 B2 | 6/2005 | Kirk et al. ............. 379/88.01 |
| 7,023,971 B1 * | 4/2006 | Huart et al. ........... 379/88.18 |
| 7,035,385 B2 * | 4/2006 | Levine et al. .......... 379/88.23 |
| 7,254,227 B2 | 8/2007 | Mumick et al. | |
| 7,324,812 B2 | 1/2008 | Wegman | |
| 7,450,699 B2 * | 11/2008 | Huart et al. ........... 379/88.18 |
| 8,032,121 B2 | 10/2011 | Kwon et al. | |
| 2002/0160754 A1 | 10/2002 | Alger et al. | |
| 2002/0160755 A1 | 10/2002 | Alger et al. | |
| 2004/0214553 A1 | 10/2004 | Kang et al. | |

(Continued)

*Primary Examiner* — Joseph T Phan
(74) *Attorney, Agent, or Firm* — Mark C. Vallone; Ortiz & Lopez (57) ABSTRACT

A method, system and computer-usable medium for terminating an in-progress voicemail and immediately connecting callers to each other based on identity. A telephone system can be enabled to detect that a calling party (e.g., subscriber "A") receives no answer from a called party (e.g., subscriber "B") and if the calling party is a current voicemail recipient from the called party then the voicemail message can be discarded by the telephone system. Such an approach enables an immediate connection between the calling party and the called party to each other by a call switching component. The incomplete voicemail message in the voicemail system is automatically discarded. A command to discard and/or erase the voicemail message can be predetermined by the telephone system.

20 Claims, 6 Drawing Sheets

U.S. PATENT DOCUMENTS

| | | |
|---|---|---|
| 2004/0264653 A1 | 12/2004 | Revisky et al. |
| 2004/0266399 A1 | 12/2004 | Simpson |
| 2005/0053216 A1* | 3/2005 | Spencer et al. .......... 379/211.01 |
| 2005/0085271 A1 | 4/2005 | Yoshino |
| 2005/0277406 A1 | 12/2005 | Diroo et al. |
| 2008/0069313 A1* | 3/2008 | Simpson et al. ........... 379/88.12 |
| 2009/0028304 A1* | 1/2009 | Burckart et al. ........... 379/88.23 |
| 2009/0207982 A1* | 8/2009 | O'Connell et al. ........ 379/88.23 |
| 2009/0238386 A1 | 9/2009 | Usher et al. |
| 2010/0091956 A1* | 4/2010 | Gopal ........................ 379/88.12 |
| 2010/0098227 A1 | 4/2010 | Hirschberg et al. |
| 2010/0260073 A1 | 10/2010 | Jager et al. |

* cited by examiner

IN-PROGRESS VOICEMAIL TRANSFER BASED ON IDENTITY

TECHNICAL FIELD

Embodiments are generally related to telecommunication products and techniques. Embodiments additionally relate in general to the field of computers and similar technologies, and in particular to software utilized in this field. Embodiments are also related to voice mail applications and techniques for transferring in-progress voicemail based on identity.

BACKGROUND OF THE INVENTION

Voicemail is a feature that is common to many modern telephony systems, including both landline and wireless systems. When a call is placed to a subscriber on a telephony system that includes a voicemail system and if the call is not answered, the call can be redirected to an automated system that instructs and enables the caller to record a voicemail message. The voicemail message is then typically retrieved by the intended recipient at a later time. In modern telecommunications systems, network-based voicemail systems provide the subscribers with the ability to receive and review saved voice messages left by the calling parties when the subscriber's telephone is busy or is unanswered.

In instances when a called party does not answer the phone in time, often the telephony system will place a calling party into the called party voicemail box. The called party can observe the number associated with a caller ID and immediately call the calling party back, while the calling party still leaves a message. Hence, the calling party has to either abandon the message, leaving a partially completed message within the called party's voicemail box, or continue and therefore ignore the called party's incoming call. This provides the called party either a busy signal or the called party can be placed into a call waiting process or into the calling party's voicemail box. The result is generally that a live call cannot be established between the calling party and the called party and both will have the voicemail to process. Similarly, when a call is suddenly disconnected, both callers with then attempt to call each other at the same time without knowing who should be the one to call back which typically results in a busy signal or voicemail recording.

One solution to this problem is to erase the voicemail messages that are in progress utilizing a keypad and following voice prompts. However, it is not known to have the phone system do this as the calling party connects to the called party's incoming call. Similarly, another solution is that the incoming call can be identified and the activity of leaving a message can be abandoned and the incoming call can be connected. Such applications, however, may not permit the user to erase the abandoned message or to associate the identification with a simultaneous act of leaving a message in the calling party's voicemail box.

A need exists for an improved method and system for transferring an in-progress voicemail based on identity in an effort to address the foregoing difficulties which is disclosed in further detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved telecommunication method and system.

It is a further aspect of the present invention to provide for a method, system and computer-usable medium for managing telephonic communication and transferring an in-progress voicemail based on identity.

The aforementioned aspects and other objectives and advantages can now be achieved as described herein. A method and system for terminating an in-progress voicemail and immediately connecting callers to each other based on identity is disclosed herein. A telephone system can be enabled to detect that a calling party (subscriber "A") receives no answer from a called party (subscriber "B") and if the calling party is a current voicemail recipient from the called party, then the voicemail message can be discarded by the telephone system. Such an approach enables an immediate connection between the calling party and the called party to each other by a call switching component. The incomplete voicemail message in the voicemail system left for subscriber "B" is automatically discarded. A command to discard and/or erase the voicemail message can be predetermined by the telephone system.

The attempts by the calling party and the called party to connect each other can be recognized by the call switching component and an immediate connection can be enabled where time is of the essence. The erasing and/or discarding the previously left voicemail message can be conducted within the same telephone system or among different telephone systems. A signal can be sent to terminate the voicemail message if the calling party and the called party are within the same telephone system. If among different telephone systems, the caller telephone system possess knowledge of the command sequence needed to discard the message in the other telephone system. A phrase can also be automatically added to the terminated message and the message can be either pre-pended or post-pended to the existing voicemail. Similarly, multiple calling party numbers that are selected by the called party can also be allowed to match affirmatively.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
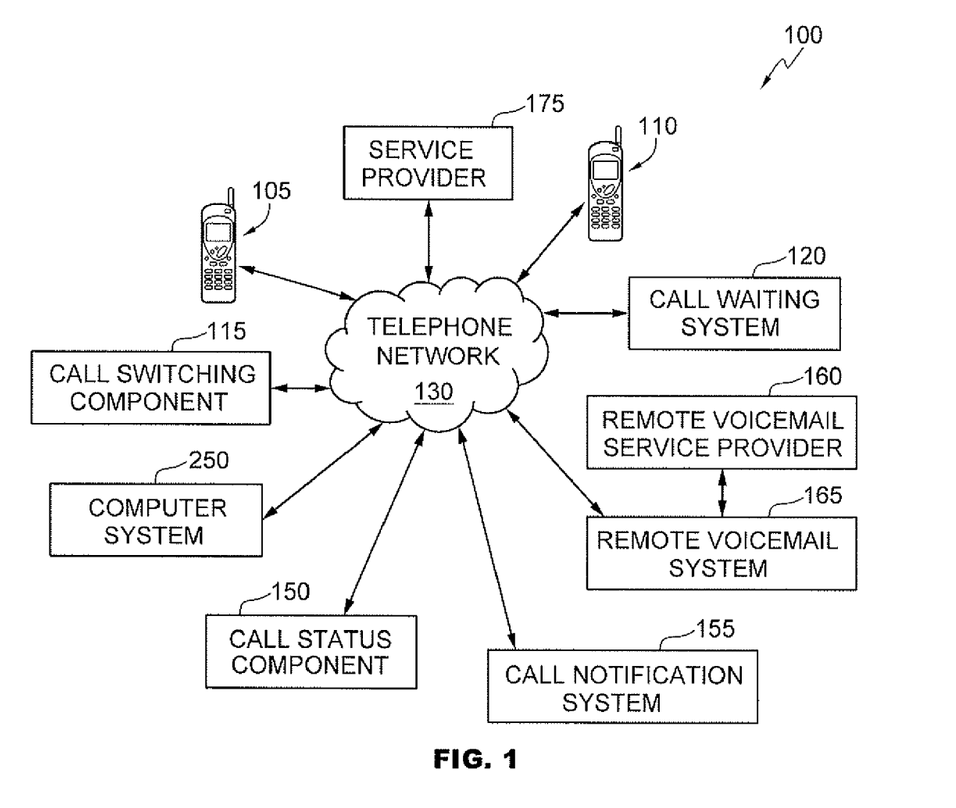
FIG. 1 illustrates a network diagram of a telephone system associated with a voicemail system, which can be implemented in accordance with a preferred embodiment.

Referring to FIG. 1, a network diagram of a telephone system 100 associated with a voicemail system 165 is illustrated in accordance with a preferred embodiment. The computer telephone system 100 includes a general-purpose computer system 250; one or more telephone devices 105 and 110, and a call-switching component 115, which are generally coupled to a telephone network 130. A remote voicemail system 165 can also be coupled to the telephone network 130, which may be utilized to provide communication access from one or more telephone devices 105 and 110 to the voicemail system 165. A call waiting system 120 enables a user to be efficiently and effectively notified that a current call is waiting. The call waiting system 120 also provides an audible notification for all incoming calls, whether the call is a current call or a waiting call which is received while the current call is still in progress.

It can be appreciated that the telephone system 100 and telephone network 130 and associated components thereof are presented for general illustrative purposes only and do not constitute limiting features of the present invention. Other types of networks and systems may be utilized in place of or in association with the configuration depicted in FIG. 1. Telephone network 130 may be, for example, a PSTN (Public Switched Telephone Network) and/or an Internet Telephony implementation, depending upon design considerations.

The voicemail system 165 can operate to record voice messages for service subscribers. The voicemail system 165 can utilize conventional technology for storing messages of a calling party. These messages can include, for example, the calling party's number and/or a voice message provided thereby. For instance, the voicemail system 165 can utilize a conventional IVR (Interactive Voice Response) system to guide the calling party in the voicemail process along with providing conventional storage media for recording said messages. In some embodiments, the voicemail system 165 can utilize computing technology such as the data-processing apparatus 200 more like the voicemail system will be within the service providers system. Note that the data-processing apparatus 200 represents one of many possible types of computing devices that can be utilized to implement the general-purpose computer system 250 depicted in FIG. 1 and FIG. 3. In some embodiments, the voicemail system 165 can be operatively coupled to a remote voicemail service provider 160.

The voicemail system 165 may store voicemail messages for the calling party and may store voicemail messages for the called party. However, the voicemail system 165 resides remotely from the called party and is typically serviced by the remote voicemail service provider 160, such as a telecommunications company. When a call is re-directed to the voicemail system 165, a called party's telephone device such as 105 is removed from the call flow and a connection between caller telephone device 110 and voicemail system 165 can be provided.

The telephone system 100 further includes a call status component 150 and a call notification system 155. The call status component 150 indicates the status of the call between the calling party and the called party. The call switching component 115 performs all connections between parties 105 and 110 and between parties 105 or 110 and the voice mail system 165. The call switching component is aware that a calling party receives no answer from a called party and has knowledge that the calling party is a current voicemail recipient from the called party A notification can be sent to the calling party from the call notification system 155 if the calling party receives a call from the called party while recording voicemail in the called party's voicemail box. If the calling party opts to receive the incoming call from the called party, a command can be sent to the voicemail system 165 to erase and/or discard the voicemail message in the called party's voicemail box. The attempts by the calling party and the called party to connect can be recognized by the call switching component 115 and immediate connection can be enabled where time is of the essence. A command to discard and/or erase the voicemail message can be predetermined by the telephone system 100 and can be conducted within the same network 130 or among different networks.

Figure 2:
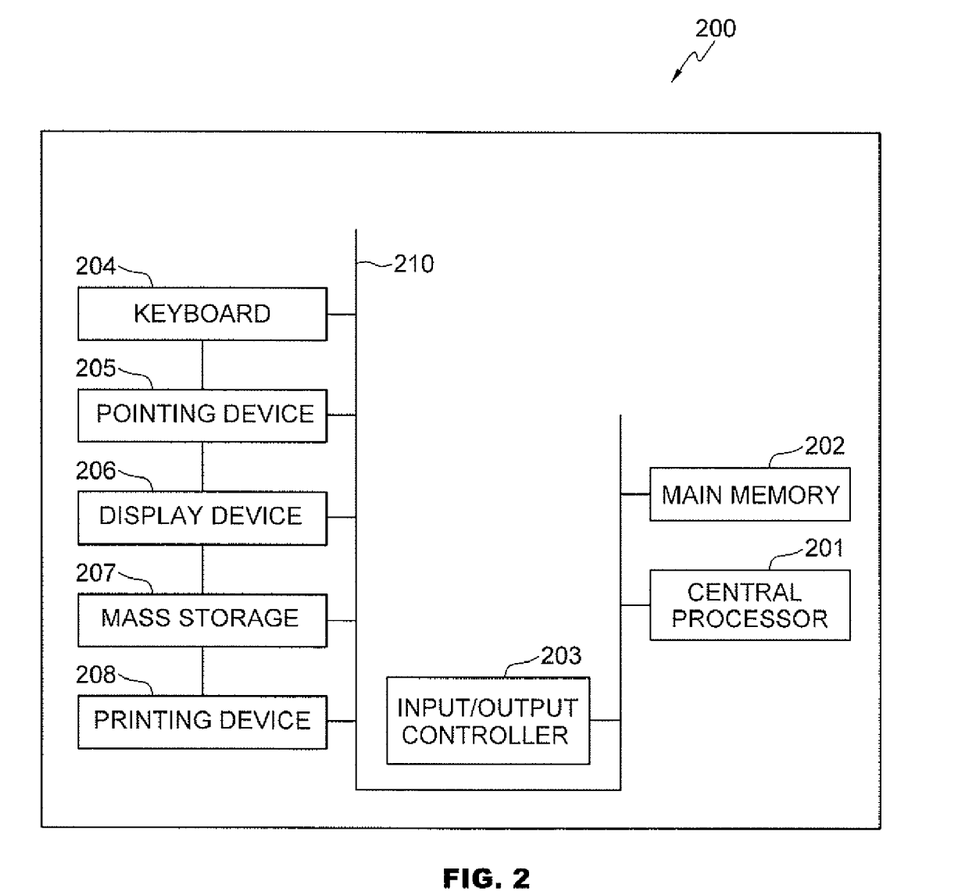
FIG. 2 illustrates a schematic view of a computer system in which the present invention may be embodied.
Figure 3:
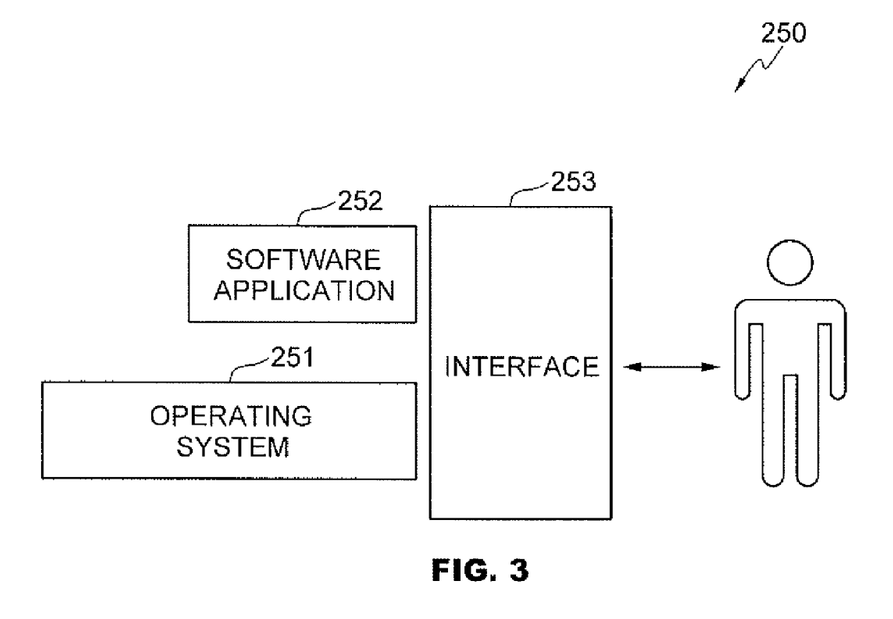
FIG. 3 illustrates a schematic view of a software system including an operating system, application software, and a user interface, which can be adapted for use in carrying out an embodiment of the present invention.

FIGS. 2-3 are provided as exemplary diagrams of data-processing environments in which embodiments of the present invention may be implemented. It should be appreciated that FIGS. 2-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 2, the present invention may be embodied in the context of a data-processing apparatus 200, such as a server. Data-processing apparatus generally includes a central processor 201, a main memory 202, an input/output controller 203, a keyboard 204, a pointing device 205 (e.g., mouse, track ball, pen device, or the like), a display device 206, and a disk memory 207 (e.g., hard disk). Additional input/output devices, such as a printing device 208, may be included in the data-processing apparatus 200 as desired. As illustrated, the various components of the data-processing apparatus 200 generally communicate through a system bus 210 or other interconnective architecture.

Illustrated in FIG. 3, a computer software system 250 can be provided for directing the operation of the data-processing apparatus 100. Software system 250, which is stored in main memory 202 and on disk memory 207, includes a kernel or operating system 251 and a shell or interface 253. One or more application programs, such as an application software 252, may be "loaded" (i.e., transferred from disk memory 207 into main memory 202) for execution by the data-processing apparatus 200. The data-processing apparatus 200 receives user commands and data through user interface 253; these inputs may then be acted upon by the data-processing apparatus 200 in accordance with instructions from operating system 251 and/or software application 252.

An interface 253, such as a graphical user interface (GUI), can also be provided in association with software application 252 and operating system 251. Software application 252 may include instructions, such as the various operations described herein with respect to the various components and modules described herein, such as, for example, the methods described herein with respect to FIGS. 4-6.

The following description is presented with respect to embodiments of the present invention, which can be embodied in the context of a data-processing system such as data-processing apparatus 200 and computer software system 250. The present invention, however, is not limited to any particular application or any particular environment. Instead, those skilled in the art will find that the system and methods of the present invention may be advantageously applied to a variety of systems and application software, including database management systems, word processors, and the like. Moreover, the present invention may be embodied on a variety of different server platforms, including Macintosh, UNIX, LINUX, and the like. Therefore, the description of the exemplary embodiments, which follows, is for purposes of illustration and not considered a limitation.

Figure 4:
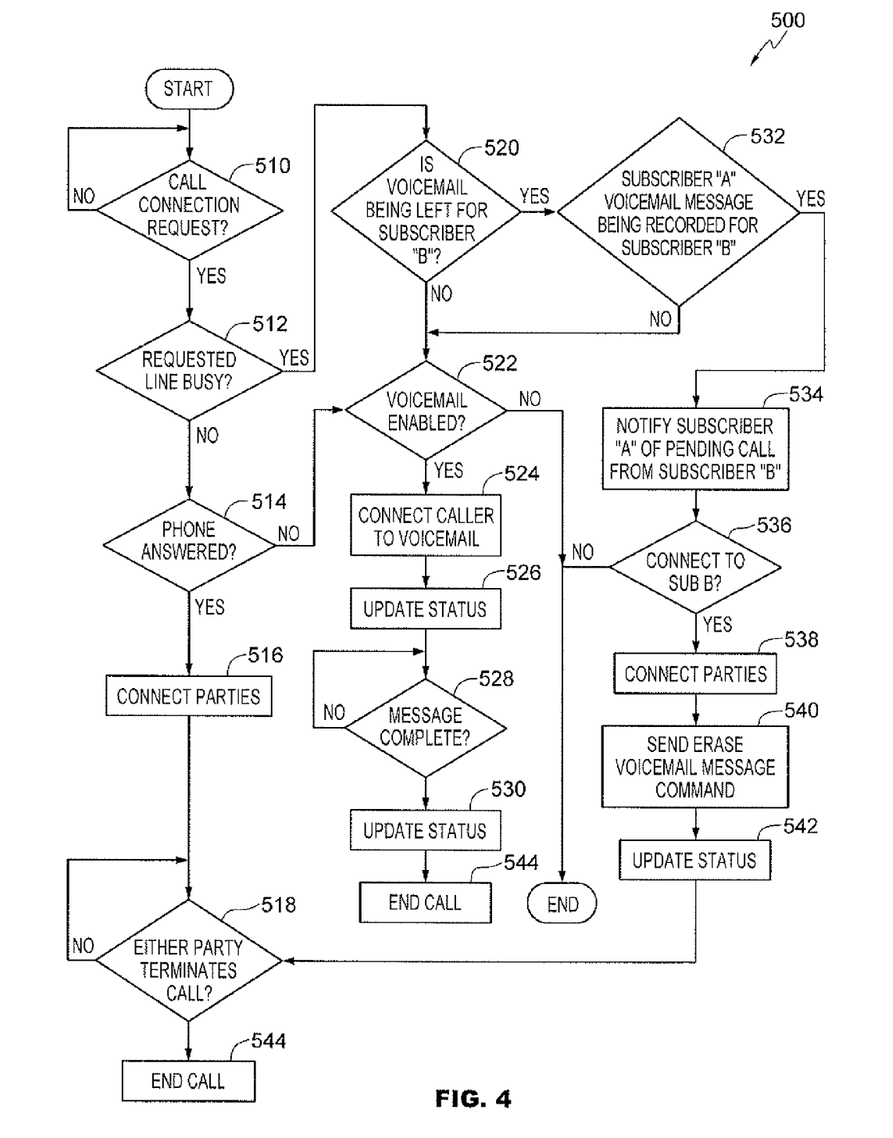
FIG. 4 illustrates a detailed flow chart of operations illustrating logical operational steps of a method for transferring in-progress voicemail and enabling immediate connection between subscribers, which can be implemented in accordance with a preferred embodiment.

FIG. 4 illustrates a detailed flow chart of operations illustrating logical operational steps of a method 500 for automatically pausing a remote voicemail recording to answer an incoming call, which can be implemented in accordance with a preferred embodiment. Note that the method 500 can be implemented in the context of a computer-useable medium that contains a program product. The method 500 depicted in FIG. 4 can also be implemented in a computer-usable medium such as data-processing apparatus 200 containing a program product. Note that the embodiments discussed herein generally relate subscriber "A" to a caller and subscriber "B" to a called party. In method 500 depicted in FIG. 4, subscriber "A" has called and is in the process of leaving a voice message for subscriber "B", A determination can be made if there is a call connection request from subscriber "B", as depicted at block 510. If there is a call connection, another determination can be made if the requested line is busy, as shown at block 512. If the requested line is not busy and if the phone is answered, as depicted at block 514, the parties are connected, as illustrated at block 516. The call can be continued until either party terminates the call.

If the requested line of subscriber "A" is busy, a determination can be made whether the subscriber "B" is a current voicemail recipient of subscriber "A", as shown at block 520. If yes, another determination can be made whether the voicemail message is still being recorded on subscriber "B's" phone, as depicted at block 532. If the voicemail message is not being recorded on the subscriber "B's" phone or if the subscriber "B" is not the current voicemail recipient or if the phone is not answered, a determination can be made whether the voicemail is enabled in subscriber "A's" phone, as illustrated at block 522. If the voicemail is enabled, the subscriber "B" can be connected to the voicemail, as shown at block 524. The call status component updates the status as "message being recorded", as shown at block 526. If the message is completed, as depicted at block 528 the call status component updates the status as "message not being recorded", as illustrated at block 530. The call can be ended, as shown at block 544.

If subscriber "A" is recording a voicemail message on subscriber "B's" phone, then the subscriber "A" can be notified of the incoming call, as depicted at block 534. A determination can be made by subscriber "A" that subscriber "B" can be connected to subscriber "A", as shown at block 536. The subscribers can then be connected and an erase message command can be sent, as illustrated at blocks 538 and 540 to discard the message left by subscriber "A". The call status component updates the status as "message not being recorded", as shown at block 542. The call can be continued until either subscriber terminates the call, as depicted at block 518.

Figure 5:
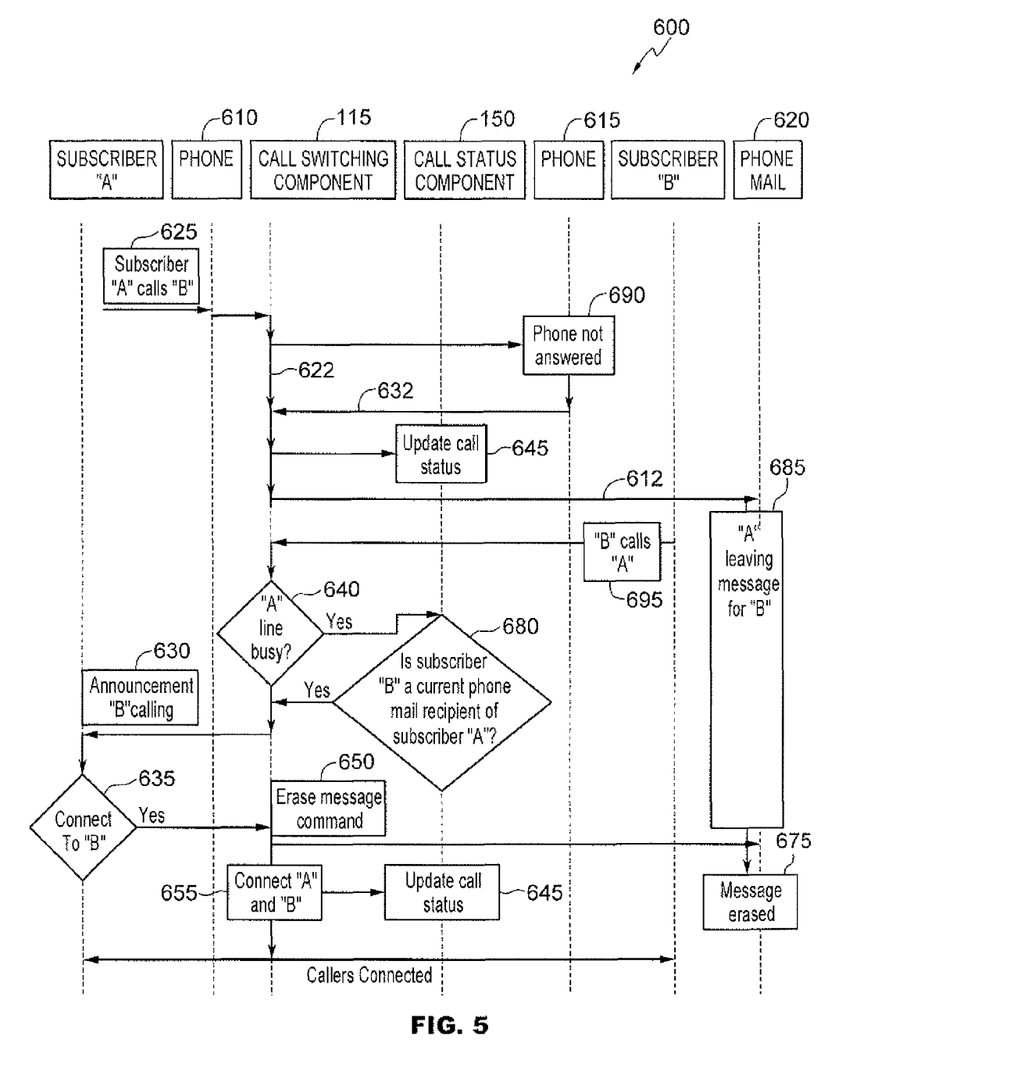
FIG. 5 illustrates a component activity diagram illustrating actions of components in a time sequence, which can be implemented in accordance with a preferred embodiment.

FIG. 5 illustrates a component activity diagram 600 illustrating actions of components in a time sequence in accordance with a preferred embodiment. The component activity diagram 600 depicted in FIG. 5 generally include components such as call switching component 115, call status component 150 and phone mail functions 620. The component activity diagram 600 illustrates the actions of such components in a time sequence. The command flow is indicated in FIG. 5 by arrow 632 and the voice conversation flow is indicated by arrow 612. As shown in the component activity diagram 600, subscriber "A" calls a subscriber "B", as shown at block 625. The telephone device 610 and call switching component 115 manages the phone mailbox for subscriber "A". The telephone device 610 and call switching component 115 manages the phone mailbox for subscriber "B". If subscriber "B" does not answer as shown at block 690, then the call connects to subscriber "B" voicemail.

Figure 6:
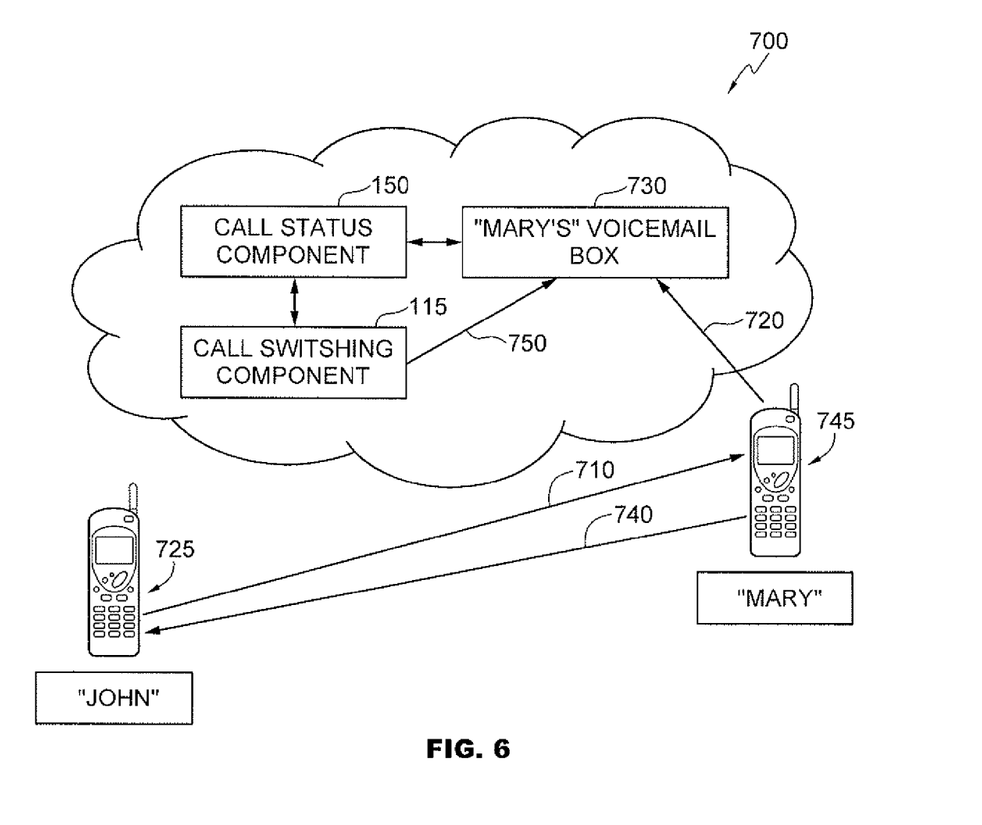
FIG. 6 illustrates an exemplary system diagram, which can be implemented in accordance with a preferred embodiment.

The status of the call can be updated by the call status component 150, as depicted at block 645. As shown in FIG. 6 the arrow 622 represents component sequential activities. A status indicator can be set indicating that subscriber "A" is leaving a message for subscriber "B", as shown at block 645. The subscriber "B" calls the subscriber "A", as shown at block 695. The call-switching component 115 determines that subscriber "B" is calling subscriber "A" and subscriber "A" is on the phone, as shown at block 640.

The call-switching component 115 determines that whether subscriber "B" is a current voicemail recipient from subscriber "A", as depicted at block 680. The call-switching component 115 inquires from subscriber "A" if subscriber "A" wishes to immediately switch to subscriber "B's" incoming call, as depicted at block 635. If yes, then the present voicemail message can be erased, as depicted at block 650. The call status 645 can be updated by the call status component 150 and subscriber "A" and subscriber "B" can be connected, as depicted at block 655. The voicemail message can be erased form the phone mail 620, as shown at block 675.

The erasing and/or discarding the previously left voicemail message can be conducted within the same telephone system 100 or among different telephone systems. A known signal can be sent to terminate the message if the subscriber "B" and the subscriber "A" are within the same telephone system 100. If among different phone systems, the subscriber "B" telephone system possess knowledge of the command sequence needed to discard the message in the other phone system (e.g., a key combination such as "*9"). Such a command can be obtained through a pre-declared communication, (e.g., as an interface description manual), a real-time inquiry, (e.g., Web Services) or by a user configuration. The user can also be presented with additional options to invoke the proposed invention to delete the voicemail message when the user engages the call waiting system 120. A phrase can also be automatically added to the terminated, such as "caller has switched over to take your call on another line, please disregard this message." This message can be either pre-pended or post-pended to the existing voicemail.

FIG. 6 illustrates an exemplary diagram of a system 700, which can be implemented in accordance with a preferred embodiment. It should be appreciated that the particular implementations shown and described herein are merely exemplary and are not intended to limit the scope of the present invention in any way. The exemplary system 700 illustrates a scenario in which "John" (e.g., subscriber "A" in the description of FIG. 5) is leaving a voicemail for "Mary" (e.g., subscriber "B" in the description of FIG. 5) and he receives a call from "Mary". In this figure, "John" calls "Mary" as indicated by arrow 710. "Mary" does not answer and the call is routed to "Mary's" voicemail box 730, as indicated by arrow 720.

A status indicator can be set, indicating that "John" is leaving a message for "Mary" by the call status component 150. "Mary" calls "John", as indicated by arrow 740. The call-switching component 115 determines that "Mary" is calling "John" AND "John" is on the phone. The call-switching component 115 further determines by interrogating the call status component 150 that "John" is currently leaving a phone message for "Mary". The call-switching component 115 inquires from "John" if "John" wishes to immediately switch to "Mary's" incoming call. If yes, then "Mary" and "John" can be connected and the message in "Mary's" voicemail box 730 can be discarded, as indicated by arrow 750.

The disclosed embodiments enable an immediate connection of the callers to each other without leaving an incomplete voicemail message in a user's voicemail system 165 as depicted in FIG. 1. Similarly, multiple calling party numbers can be allowed to match affirmatively, e.g., if the calling party calls back on a different, but also known to be operated by the calling party, such as an alternate home, wired or wireless number, and if a match is found, the voicemail message can be terminated. The callers can then be connected as if the called party returns the call from the originally called number. This feature can be packaged into a set of similar features as part of a bundled service by the telephone service provider 175. The value of the bundled services, being more than the sum of the individual services and may provide the service provider 175 a competitive advantage.

Note that programs defining functions on the present invention can be stored in a data storage system or a computer system on a variety of data storage media, which include, without limitation, non-writable storage media (e.g., CD-ROM), writable storage media (e.g., hard disk drive, read/write CD ROM, optical media), and system memory such as, but not limited to, Random Access Memory (RAM). It should be understood, therefore, that such data storage media, when storing computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the methods described herein may be deployed as process software in the context of a computer system or data-processing system and/or server or group of servers.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data-processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for connecting telephone calls, the method comprising the steps of:

a processor re-directing, to a voicemail system, a telephone call that has been placed by a telephone of a first party to a telephone of a second party and that has not been answered by the telephone of the second party, the voicemail system including a voicemail mailbox for the second party;

the processor determining that the telephone of the second party is placing a telephone call to the telephone of the first party while the first party is leaving a voicemail message in the voicemail mailbox for the second party during the re-directed telephone call;

the processor sending an inquiry to the telephone of the first party as to whether to switch connectivity on the telephone of the first party from the re-directed telephone call to the telephone call being placed by the second party; and in response to an affirmative response to the inquiry by the first party:

the processor connecting, to the telephone of the first party, the telephone call being placed by the second party; and the processor automatically sending a command to the voicemail system to delete the voicemail message from the voicemail mailbox for the second party.

2. A system, comprising:

a processor;

a data bus coupled to said processor; and a computer-readable tangible storage device having computer program code stored thereon, said computer-readable tangible storage device being coupled to said data bus, said computer program code comprising instructions executable by said processor to implement a method for connecting telephone calls, the method comprising the steps of:

the processor re-directing, to a voicemail system, a telephone call that has been placed by a telephone of a first party to a telephone of a second party and that has not been answered by the telephone of the second party, the voicemail system including a voicemail mailbox for the second party;

the processor determining that the telephone of the second party is placing a telephone call to the telephone of the first party while the first party is leaving a voicemail message in the voicemail mailbox for the second party during the re-directed telephone call;

the processor sending an inquiry to the telephone of the first party as to whether to switch connectivity on the telephone of the first party from the re-directed telephone call to the telephone call being placed by the second party;

in response to an affirmative response to the inquiry by the first party:

the processor connecting, to the telephone of the first party, the telephone call being placed by the second party; and the processor automatically sending a command to the voicemail system to delete the voicemail message from the voicemail mailbox for the second party.

3. A computer-readable tangible storage device having computer program code stored thereon, said computer program code comprising instructions executable by a processor of a data-processing apparatus to implement a method for connecting telephone calls, the method comprising the steps of:

the processor re-directing, to a voicemail system, a telephone call that has been placed by a telephone of a first party to a telephone of a second party and that has not been answered by the telephone of the second party, the voicemail system including a voicemail mailbox for the second party;

the processor determining that the telephone of the second party is placing a telephone call to the telephone of the first party while the first party is leaving a voicemail message in the voicemail mailbox for the second party during the re-directed telephone call;

the processor sending an inquiry to the telephone of the first party as to whether to switch connectivity on the telephone of the first party from the re-directed telephone call to the telephone call being placed by the second party;

in response to an affirmative response to the inquiry by the first party:

the processor connecting, to the telephone of the first party, the telephone call being placed by the second party; and the processor automatically sending a command to the voicemail system to delete the voicemail message from the voicemail mailbox for the second party.

4. The method of claim 1, further comprising the step of:
before the step of the processor sending the inquiry, the processor determining that the second party is a current voicemail recipient.

5. The method of claim 1, wherein the telephone of the first party and the telephone of the second party are in a same telephone system, and wherein the step of the processor sending the command to the voicemail system comprises the processor sending a known signal to the voicemail system.

6. The method of claim 1, wherein the telephone of the first party and the telephone of the second party are in different telephone systems, and wherein the step of the processor sending the command to the voicemail system comprises the processor sending a key combination to the voicemail system.

7. The method of claim 1, wherein the telephone of the first party and the telephone of the second party are in different telephone systems, and wherein the method further comprises before the step of the processor sending the command to the voicemail system, the processor obtaining the command from a web service.

8. The method of claim 1, wherein the telephone of the first party and the telephone of the second party are in different telephone systems, and wherein the method further comprises before the step of the processor sending the command to the voicemail system, the processor obtaining the command from a user configuration.

9. The method of claim 1, wherein the step of the processor sending the command to the voicemail system is responsive to a party engaging a call waiting system.

10. The system of claim 2, wherein the method further comprises the step of:
before the step of the processor sending the inquiry, the processor determining that the second party is a current voicemail recipient.

11. The system of claim 2, wherein the telephone of the first party and the telephone of the second party are in a same telephone system, and wherein the step of the processor sending the command to the voicemail system comprises the processor sending a known signal to the voicemail system.

12. The system of claim 2, wherein the telephone of the first party and the telephone of the second party are in different telephone systems, and wherein the step of the processor sending the command to the voicemail system comprises the processor sending a key combination to the voicemail system.

13. The system of claim 2, wherein the telephone of the first party and the telephone of the second party are in different telephone systems, and wherein the method further comprises before the step of the processor sending the command to the voicemail system, the processor obtaining the command from a web service.

14. The system of claim 2, wherein the telephone of the first party and the telephone of the second party are in different telephone systems, and wherein the method further comprises before the step of the processor sending the command to the voicemail system, the processor obtaining the command from a user configuration.

15. The computer-readable tangible storage device of claim 3, wherein the method further comprises the step of:
before the step of the processor sending the inquiry, the processor determining that the second party is a current voicemail recipient.

16. The computer-readable tangible storage device of claim 3, wherein the telephone of the first party and the telephone of the second party are in a same telephone system, and wherein the step of the processor sending the command to the voicemail system comprises the processor sending a known signal to the voicemail system.

17. The computer-readable tangible storage device of claim 3, wherein the telephone of the first party and the telephone of the second party are in different telephone systems, and wherein the step of the processor sending the command to the voicemail system comprises the processor sending a key combination to the voicemail system.

18. The computer-readable tangible storage device of claim 3, wherein the telephone of the first party and the telephone of the second party are in different telephone systems, and wherein the method further comprises before the step of the processor sending the command to the voicemail system, the processor obtaining the command from a web service.

19. The computer-readable tangible storage device of claim 3, wherein the telephone of the first party and the telephone of the second party are in different telephone systems, and wherein the method further comprises before the step of the processor sending the command to the voicemail system, the processor obtaining the command from a user configuration.

20. The computer-readable tangible storage device of claim 3, wherein the step of the processor sending the command to the voicemail system is responsive to a party engaging a call waiting system.

* * * * *